United States Patent [19]
Natarjan et al.

[11] Patent Number: 5,857,104
[45] Date of Patent: Jan. 5, 1999

[54] SYNTHETIC DYNAMIC BRANCH PREDICTION

[75] Inventors: Balas K. Natarjan, Los Gatos; Scott A. Mahlke, Mountain View, both of Calif.

[73] Assignee: Hewlett-Packard Company, Palo Alto, Calif.

[21] Appl. No.: 757,038

[22] Filed: Nov. 26, 1996

[51] Int. Cl.⁶ .................................. G06F 9/32; G06F 9/45
[52] U.S. Cl. ..................... 395/705; 395/706; 395/704; 395/709; 395/586; 395/587; 395/183.11; 395/183.14
[58] Field of Search ................. 395/704–706, 395/709, 183.11, 183.14, 586, 587, 581

[56] References Cited

U.S. PATENT DOCUMENTS

| | | | |
|---|---|---|---|
| 5,293,631 | 3/1994 | Rau et al. | 397/700 |
| 5,367,703 | 11/1994 | Levitan | 395/800.23 |
| 5,596,732 | 1/1997 | Hosoi | 395/709 |
| 5,655,122 | 8/1997 | Wu | 395/705 |
| 5,659,752 | 8/1997 | Heisch et al. | 395/704 |
| 5,687,360 | 11/1997 | Chang | 395/587 |
| 5,721,893 | 2/1998 | Holler et al. | 395/586 |

*Primary Examiner*—James P. Trammell
*Assistant Examiner*—Tuan Q. Dam
*Attorney, Agent, or Firm*—Thomas X. Li

[57] ABSTRACT

A compiler includes a branch statistics data analyzer to analyze branch statistics data of a branch instruction to construct a branch predictor function for the branch instruction. A branch prediction instruction generator is coupled to the branch statistics data analyzer to generate at least one prediction instruction to implement the branch predictor function. A main compiling engine is coupled to the branch prediction instruction generator to insert the prediction instruction before the branch instruction. A method of dynamically predicting a branch instruction of a program is also described.

19 Claims, 15 Drawing Sheets for $i = 1, 2, ..., n$ do
  for all register values $v$ do $C_i[v] = 0$;
for $i = 1, 2, ..., n$ do
  for $i = 1, 2, ..., n$ do
    for all register values $u, v$ do $C_{i,j}[u][v] = 0$;
for each pass through branch $b$ do
  if $v_b = 1$ then
    for $i = 1, 2, ..., n$ do increment $C_i[v_i]$;
    for $i, j = 1, 2, ..., n$ do increment $C_{i,j}[v_i][v_j]$;
  else
    for $i = 1, 2, ..., n$ do decrement $C_i[v_i]$;
    for $i, j = 1, 2, ..., n$ do decrement $C_{i,j}[v_i][v_j]$;
for $i = 1, 2, ..., n$ do $S_i = \sum_v |C_i[v]|$;
for $i, j = 1, 2, ..., n$ do $S_{i,j} = \sum_{u,v} |C_{i,j}[u][v]|$;
let $k$ be such that $S_k$ is maximum over all $S_i$.
let $l, m$ be such that $S_{l,m}$ is maximum over all $S_{i,j}$.
if $S_{l,m} > S_k$ then
  output the two-register predictor based on $r_l$ and $r_m$.
else output the one-register predictor based on $r_k$;

One-register predictor based on $r_k$
  predict $(C_k[v_k] > 0)$

Two-register predictor based on $r_l, r_m$
  predict $(C_{l,m}[v_l][v_m] > 0)$

*Figure 7* for $i = 1, 2, ..., n$ do
    for all quantized register values $v$ do $C_i[v] = 0$;
for $i = 1, 2, ..., n$ do
    for $i = 1, 2, ..., n$ do
        for all register values $u, v$ do $C_{i,j}[u][v] = 0$;
for each pass through branch $b$ do
    Quantize $v_1, v_2, ..., v_n$;
    if $v_b = 1$ then
        for $i = 1, 2, ..., n$ do increment $C_i[v_i]$;
        for $i, j = 1, 2, ..., n$ do increment $C_{i,j}[v_i][v_j]$;
    else
        for $i = 1, 2, ..., n$ do decrement $C_i[v_i]$;
        for $i, j = 1, 2, ..., n$ do decrement $C_{i,j}[v_i][v_j]$;
for $i = 1, 2, ..., n$ do
    $S_i = \max_{v^*} \left| \sum_{v < v^*} C_i[v] \right| + \left| \sum_{v \geq v^*} C_i[v] \right|$ ;
for $i, j = 1, 2, ..., n$ do
    $S_{i,j} = \max_{u^*, v^*}$
$$\left| \sum_{u < u^*, v < v^*} C_{i,j}[u][v] \right| + \left| \sum_{u \geq u^*, v < v^*} C_{i,j}[u][v] \right| +$$
$$\left| \sum_{u < u^*, v \geq v^*} C_{i,j}[u][v] \right| + \left| \sum_{u \geq u^*, v \geq v^*} C_{i,j}[u][v] \right| ;$$

let $k$ be such that $S_k$ is maximum over all $S_i$.
let $l, m$ be such that $S_{l,m}$ is maximum over all $S_{i,j}$.

if $S_{l,m} > S_k$ then
    output the two-register predictor based on $r_l$ and $r_m$.
else output the one-register predictor based on $r_k$;

One-register/One-compare predictor based on $r_k$
    if $v_k < v^*$ then predict ($\sum_{v < v^*} C_k[v] > 0$);
    else predict ($\sum_{v \geq v^*} C_k[v] > 0$);

Two-register/Two-compare predictor based on $r_l, r_m$
    let $u = v_l; v = v_m$;
    if $u < u^*, v < v^*$ then
        predict ($\sum_{u < u^*, v < v^*} C_{l,m}[u][v] > 0$);
    else if $u \geq u^*, v < v^*$ then
        predict ($\sum_{u \geq u^*, v < v^*} C_{l,m}[u][v] > 0$);
    else if $u < u^*, v \geq v^*$ then
        predict ($\sum_{u < u^*, v \geq v^*} C_{l,m}[u][v] > 0$);
    else predict ($\sum_{u \geq u^*, v \geq v^*} C_{l,m}[u][v] > 0$);

*Figure 8*

| BENCHMARK | MISPREDICTION RATE (%) | | |
|---|---|---|---|
| | 2BIT-CTR | PROFILE | CS-PRACTICAL |
| 008.ESPRESSO | 9.449 | 12.703 | 6.942 |
| 023.EQNTOTT | 17.561 | 13.381 | 8.214 |
| 026.COMPRESS | 12.795 | 13.933 | 9.808 |
| 072.SC | 6.783 | 11.000 | 5.399 |
| 099.GO | 26.880 | 24.853 | 24.317 |
| 124.M88KSIM | 5.840 | 5.463 | 3.630 |
| GREP | 1.611 | 1.333 | 1.164 |
| LEX | 2.268 | 2.660 | 1.863 |
| QSORT | 17.652 | 16.249 | 14.117 |
| WC | 9.961 | 9.394 | 4.822 |
| YACC | 5.636 | 7.783 | 5.620 |
| A-MEAN | 10.585 | 10.796 | 7.809 |

*Figure 11*

| BENCHMARK | MISPREDICTION RATE (%) | | |
|---|---|---|---|
| | 2BIT-CTR | PROFILE | CS-PRACTICAL |
| 008.ESPRESSO | 22.472 | 33.302 | 11.036 |
| 023.EQNTOTT | 18.834 | 14.279 | 8.595 |
| 026.COMPRESS | 20.393 | 21.958 | 14.955 |
| 072.SC | 17.030 | 28.748 | 10.213 |
| 099.GO | 35.015 | 33.238 | 25.827 |
| 124.M88KSIM | 49.891 | 49.861 | 0.386 |
| GREP | 3.748 | 3.097 | 2.695 |
| LEX | 3.611 | 4.124 | 2.395 |
| QSORT | 23.269 | 21.650 | 18.612 |
| WC | 22.255 | 20.993 | 10.767 |
| YACC | 12.280 | 19.627 | 10.857 |
| A-MEAN | 20.800 | 22.807 | 10.576 |

*Figure 12*

| REG | PASS # | | | | | | |
|---|---|---|---|---|---|---|---|
| | 1 | 2 | 3 | 4 | 5 | 6 | 7 |
| $\mathcal{V}_b$ | 1 | 1 | 0 | 1 | 0 | 0 | 1 |
| $\mathcal{V}_1$ | 17 | 17 | 19 | 13 | 14 | 19 | 17 |
| $\mathcal{V}_2$ | 15 | 12 | 15 | 12 | 0 | 8 | 8 |

*Figure 13*

SYNTHETIC DYNAMIC BRANCH PREDICTION

BACKGROUND OF THE INVENTION

1. Field of the Invention

The present invention pertains to computer systems. More particularly, this invention relates to a synthetic dynamic branch prediction in a computer system that is both accurate and cost effective.

2. Description of the Related Art

As is known, a computer system typically includes one or more central processing units (CPUs) or processors. The processor typically executes instructions of software programs to perform a variety of tasks in the computer system. The instructions of the software programs are in machine language form (i.e., binary form) because the processor can only understand and interpret machine language. The machine language instructions are referred to as machine code or object code below.

Because the machine language is very difficult to write and understand, high level source programming languages (such as C and Fortran) have been developed to code or define the instructions of a software program in a humanly readable fashion. Such a source programming language software program is referred to as source code. The source code needs to be converted or translated into the machine code by a compiler program before being executed by the processor.

The earlier prior art processors are typically single instruction single data (SISD) processors. A SISD processor typically receives a single instruction stream and a single data stream. The SISD processor sequentially executes each instruction, acting on data in a single storage area. This SISD processor architecture, however, presents an obstacle to achieving high processing throughput.

To increase the processing throughput of a processor, many parallel processing architectures have been developed. One type of such parallel processing model is known as pipeline processing. In a simple pipelined processor, the pipeline typically includes several stages. These stages, for example, may include a fetch stage, a decode stage, a execute stage, and a write-back stage. In such a pipelined processor, instructions are executed sequentially through these stages of the pipeline in an overlapping fashion.

However, the performance of the pipelined processors depends strongly on the efficiency with which branch operations are handled. The branch operations are referred to as branches below. As is known, branches typically cause lengthy breaks in the pipeline by redirecting instruction flow during program execution. This is typically due to the fact that when a branch instruction is fetched, the address of the instruction that will be executed next is not immediately known. Hence, the fetch stage must stall and wait for the branch target to be calculated. The target of a branch is generally resolved during the execute stage. Therefore, the fetch unit stalls while the branch advances through the decode and execute stages of the pipeline. After the branch instruction has completed execution, the branch direction is known and instruction fetch can safely resume at the correct target address. Stalling the instruction fetch for each branch introduces a large number of empty cycles, referred to as bubbles, into the pipeline. These bubbles severely limit the performance of pipelined processors by restricting the utilization of the processor resources. The performance problem becomes amplified as pipeline depth and instruction issue width of processors are increased. The instruction issue width refers to the number of instructions that the processor can execute per cycle.

In order to minimize the pipeline breaks caused by branch instructions, branch prediction is employed. Branch prediction is an effective approach for dealing with branches in pipelined processors. Branch prediction guesses the targets of branches in order to speculatively continue executing instructions while a branch target is being calculated. In the cases where the prediction is correct, all the speculative instructions are useful instructions, and pipeline bubbles are completely eliminated. On the other hand, incorrect prediction results in the normal pipeline bubbles while the branch target is resolved, as well as additional delay to remove all instructions that were improperly executed. Clearly, the accuracy of the branch prediction strategy is central to processor performance.

Traditionally, the branch prediction is accomplished in one of two ways, static prediction at compile-time via compiler analysis or dynamic prediction at run-time via special hardware structures. Static branch prediction utilizes information available at compile time to make predictions. In general, the compiler is responsible for static branch prediction. The most common static branch prediction approach is to use profile information. FIGS. 1 and 2 show this implementation. FIG. 1 shows the instruction format for a branch instruction and FIG. 2 is a state diagram illustrating the process of the static branch prediction approach using profile information.

As can be seen from FIG. 1, a prediction bit is provided for each branch instruction. To set the prediction bit for a branch instruction, the source code containing the branch instruction is first converted into the machine code by a compiler (see the pre-compilation stage 20 of FIG. 2). At this time, the prediction bit of the branch instruction is not set. Then the machine code is executed with sample input data (see the code execution stage 21 of FIG. 2) to obtain branch statistics data of the branch instruction. The branch statistics data indicates the times that the branch is taken (i.e., to branch) and the times that the branch is not taken (i.e., not to branch). The source code is then compiled at the compilation stage 22 with the statistics data to set the prediction bit of the branch instruction accordingly. If the statistics data indicates that the branch is taken in the majority of occasion, then the compiler sets the prediction bit of the branch instruction to taken at the compilation stage 22. Otherwise, the compiler sets the prediction bit to not taken. The major advantage of the static branch prediction is low cost. Another advantage is that the prediction is realized without requiring hardware. Branch state information is not required during code execution because the prediction is explicitly specified by the program itself.

Disadvantages are, however, associated with the static branch prediction. One disadvantage is that the prediction is fixed at compile-time, thus it cannot vary during program execution. As a result, the accuracy of static branch prediction is inherently limited for unbiased branches. Another disadvantage is that each branch instruction requires an extra bit for the prediction.

On the other hand, dynamic branch prediction utilizes run-time behavior to make predictions. In general, a hardware structure is provided to maintain branch history. Based on the current history, a prediction is made for each branch encountered in the program. FIG. 3 shows a prior art scheme of dynamic branch prediction. As can be seen from FIG. 3, a 2-bit counter 31 is provided that includes a number of entries. When a branch 30a of a program 30 is executed, the branch 30a is hashed to its corresponding entry 31a of the 2-bit counter 31. The value stored in the entry 31a determines whether the branch 30a should be taken or not. If the branch 30a is taken, the counter value stored in the entry 31a is incremented. If the branch 30a is not taken, the counter value stored in the entry 31a is decremented. When the counter value of an entry of the counter 31 reaches three, the value will remain at three when further incremented. The major advantage of the dynamic branch prediction is the increased accuracy. The use of run-time information and the ability to predict a branch differently during various phases of execution allow dynamic branch prediction techniques to enjoy significantly higher accuracy than that of the static branch prediction.

However, the dynamic branch prediction is not without disadvantages. One major disadvantage of the dynamic branch prediction techniques is the cost. This is due to the fact that dynamic branch prediction techniques typically utilize relatively large amounts of hardware and provide difficult challenges for circuit designers to meet cycle time goals.

SUMMARY OF THE INVENTION

One of the features of the present invention is to minimize pipeline breaks caused by branch instructions by providing branch prediction.

Another feature of the present invention is to optimize the branch prediction with maximized accuracy and minimized cost.

A further feature of the present invention is to provide a synthesized dynamic branch prediction function that is cost effective and relatively accurate.

Described below is a compiler that includes a branch statistics data analyzer to analyze branch statistics data of a branch instruction to construct a branch predictor function for the branch instruction. A branch prediction instruction generator is coupled to the branch statistics data analyzer to generate at least one prediction instruction to implement the branch predictor function. A main compiling engine is coupled to the branch prediction instruction generator to insert the prediction instruction before the branch instruction.

In addition, a runtime branch prediction synthesizer is also described that includes a branch statistics data analyzer to analyze branch statistics data of a branch instruction to construct a branch predictor function for the branch instruction. A branch prediction instruction generator is coupled to the branch statistics data analyzer to generate at least one prediction instruction to implement the branch predictor function. A runtime code manager is coupled to the branch prediction instruction generator to insert the prediction instruction before the branch instruction.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 7 shows a routine run by the branch statistics data analyzer of FIG. 6;

FIG. 8 shows another routine run by the branch statistics data analyzer of FIG. 6;

FIGS. 11 and 12 show two comparison tables of the branch misprediction rate for the static prediction, the dynamic prediction, and the compiler synthesized dynamic prediction schemes;

FIG. 13 shows a table of a register dump for seven passes of a branch;

DETAILED DESCRIPTION OF THE INVENTION

The following detailed description of some embodiments of the present invention uses certain specific terminologies for the sake of clarity. However, the invention is not limited to those specific terms employed, but rather includes all technical equivalents operating in a substantially similar manner to achieve a substantially similar result.

Figure 1:
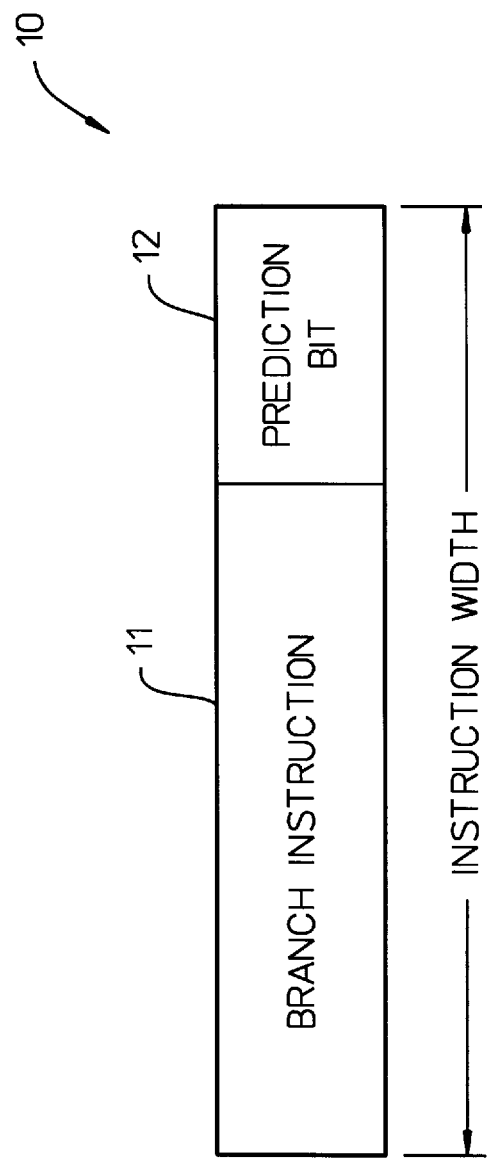
FIG. 1 shows the instruction format of a branch instruction for static branch prediction.
Figure 2:
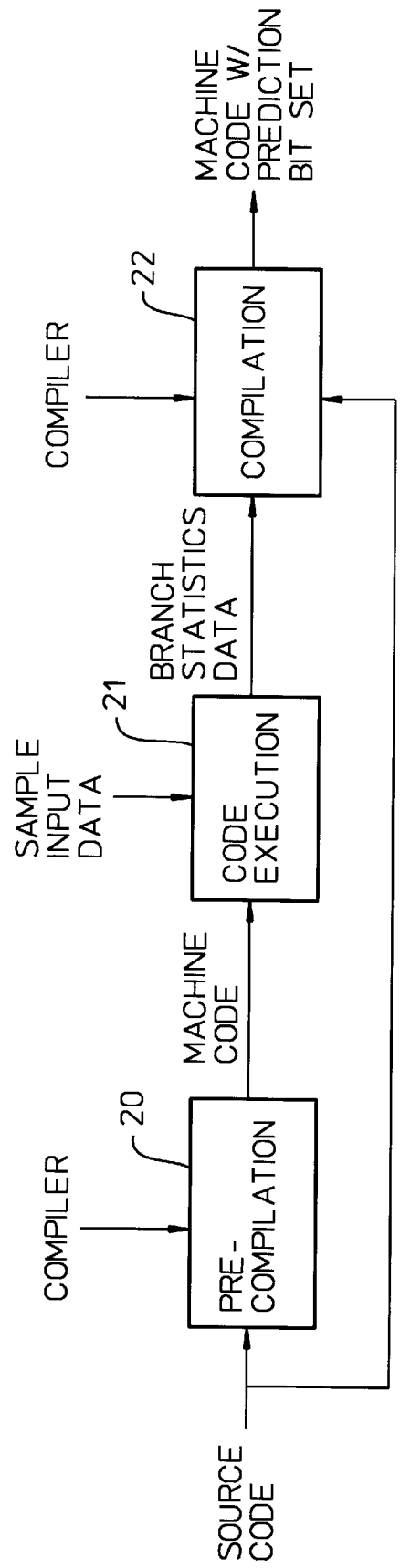
FIG. 2 is a state diagram illustrating a prior art process of the static branch prediction approach using profile information.
Figure 3:
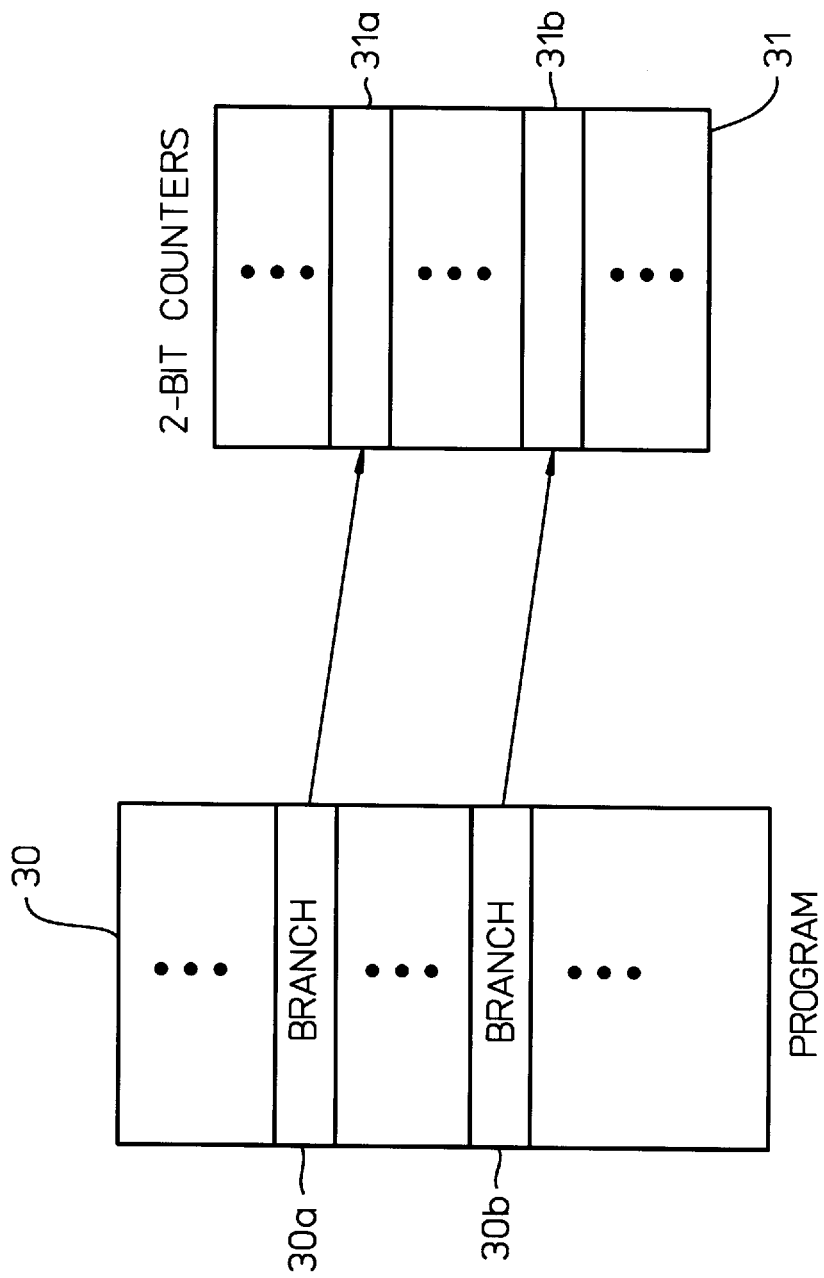
FIG. 3 shows a prior art dynamic branch prediction scheme.
Figure 4:
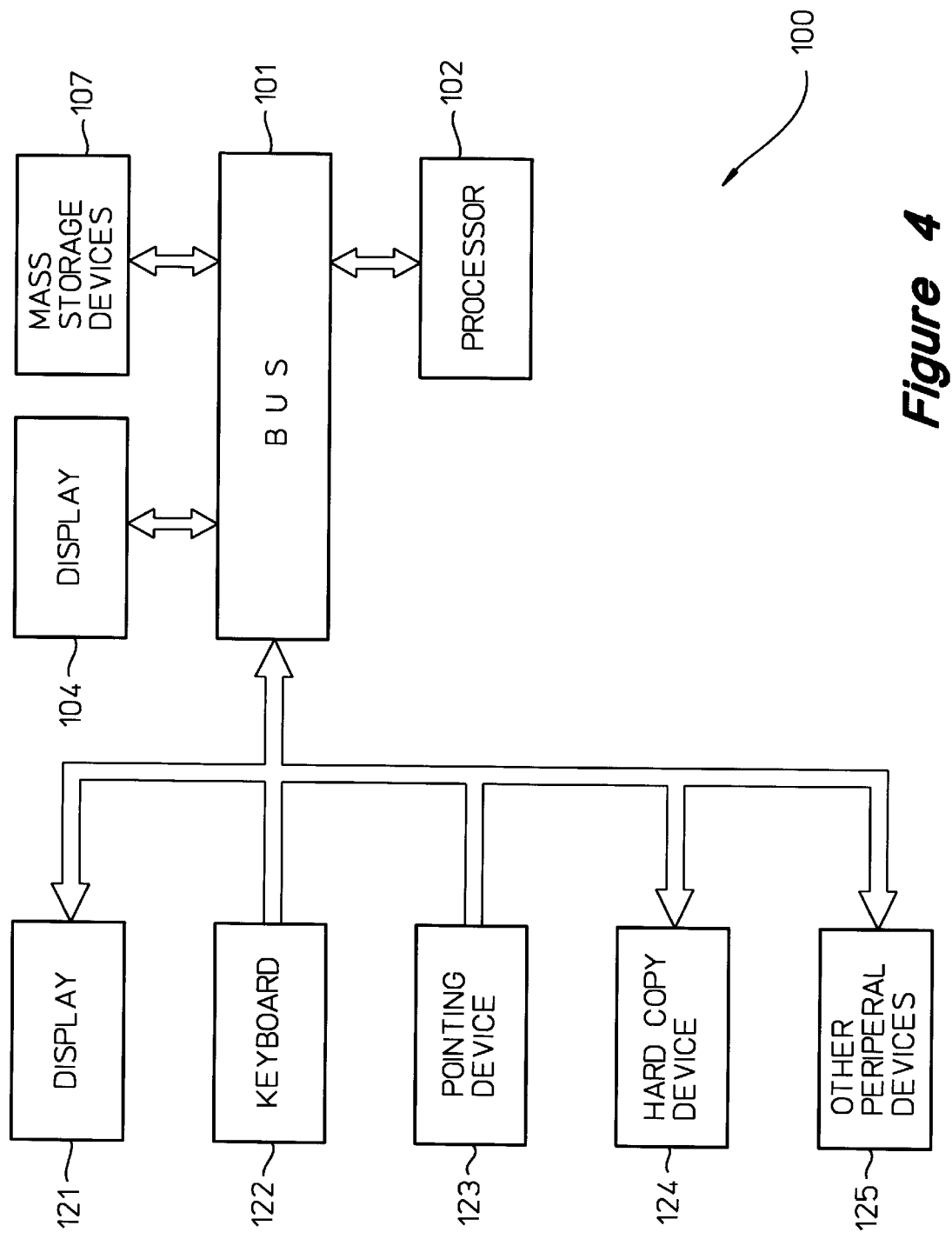
FIG. 4 shows a computer system that includes a processor that supports prepare-to-branch instructions.

FIG. 4 illustrates a computer system 100 that includes a processor 102 that includes a branch prediction mechanism. The computer system 100 also includes a compiler 200 (shown in FIG. 5). The branch prediction mechanism of the processor 102 allows the compiler 200 (FIG. 5) to include a compiler synthesized dynamic branch prediction function that implements one embodiment of the present invention. The compiler 200 and its compiler synthesized dynamic branch prediction function will be described in more detail below.

The major feature of the branch prediction mechanism for the processor 102 is the visibility of the branch prediction in the instruction set of the processor 102. This allows the compiler 200 of the computer system 100 to be able to generate instructions which manipulate the prediction values for a particular branch of a program. In doing so, new prediction functions can be realized by allowing the compiler 200 to insert additional instructions into the program to compute prediction values and write them into the appropriate predictor locations. In addition, the prediction mechanism of the processor 102 allows association of branch predictor locations with the branches themselves. This is necessary for selectively modifying prediction values for specific branches.

In one embodiment, the branch prediction mechanism of the processor 102 is a static prediction mechanism. In another embodiment, the branch prediction mechanism of the processor 102 is a hardware-based dynamic prediction mechanism. Alternatively, the processor 102 can have other types of branch architectures that support branch prediction. Both the extended static branch prediction mechanism and the hardware-based dynamic branch prediction mechanism allow the processor 102 to sufficiently and efficiently support the compiler synthesized branch prediction function of the present invention.

When, for example, the processor 102 supports the extended static prediction mechanism, the processor 102 allows a branch to be performed in multiple steps—three steps for a conditional branch and two steps for an unconditional branches. The steps involved in a conditional branch are as follows:

1. Specification of the target address: This can be done by a prepare-to-branch or other similarly functioning instruction. Prepare-to-branch (PTB) instructions specify the branch target address in advance of the branch point allowing a prefetch of the instructions from the target address to be performed. A static prediction bit is also provided at this step to indicate the direction the compiler believes the branch will go.
2. Computation of the branch condition: The branch condition can be computed by a compare-to-predicate or other similarly functioning instruction and stored in a predicate register.
3. Transfer of control: The actual redirection of control flow occurs if the branch is taken. There are several types of branch instructions including conditional, unconditional, branch and link, and special branches to support loop execution.

An unconditional branch (or a jump) does not involve the computation of the condition, and thus, consists of only the first and last steps.

To perform a branch operation, the prepare-to-branch instruction writes the computed effective target address and the prediction bit into a set of branch target registers (BTRs) (not shown in FIG. 4). As described above, the prepare-to-branch instruction specifies the target address of the branch if it is taken. The branch target registers are the medium to communicate the target and prediction information to the branch unit and the instruction fetch unit of the processor 102.

In addition, a predicate register operand field is specified in the prepare-to-branch instruction. This allows a prediction value to be computed by an arbitrary set of machine instructions with the final result placed in a predicate register (not shown in FIG. 4) of the processor 102. The prepare-to-branch instruction subsequently reads the particular predicate register to obtain the prediction value.

The compare-to-predicate instruction performs the actual comparison operation and store the result into the predicate register. The final instruction performs the actual branch. Each branch specifies a source BTR, which contains the branch target address. Furthermore, all branches which are conditional specify a source predicate operand as the condition. Moreover, a new 1-bit literal field is added to the prepare-to-branch instruction which specifies whether the predicate operand is the actual branch direction or simply a prediction.

The computer system 100 can be a personal computer, a notebook computer, a palmtop computer, a workstation, a mainframe computer, or a super computer. Alternatively, the computer system 100 can be other type of computer systems. For example, the computer system 100 can be a network server or a video conferencing system.

The computer system 100 includes a bus 101 connected to the processor 102. A memory 104 is connected to the bus 101 and typically stores information and instructions to be executed by the processor 102. The memory 104 may also include a frame buffer (not shown in FIG. 4) that stores a frame of bitmap image to be displayed on a display 121 of the computer system 100.

The memory 104 can be implemented by various types of memories. For example, the memory 104 can be implemented by a RAM (Random Access Memory) and/or a nonvolatile memory. In addition, the memory 104 can be implemented by a combination of a RAM, a ROM (Read Only Memory), and/or an electrically erasable and programmable nonvolatile memory.

The computer system 100 also includes a mass storage device 107 connected to the bus 101. The mass storage device 107 stores data and other information. In addition, the mass storage device 107 stores system and application programs. The programs are executed by the processor 102 and need to be downloaded to the memory 104 before being executed by the processor 102.

A display 121 is coupled to the bus 101. A keyboard or keypad input device 122 is also provided that is connected to the bus 101. An additional input device of the computer system 100 is a cursor control device 123, such as a mouse, a trackball, a trackpad, or a cursor direction key. Another device which may also be included in the computer system 100 is a hard copy device 124. The hard copy device 124 is used in the computer system 100 to print text and/or image information on a medium such as paper, film, or similar types of media.

The computer system 100 also includes other peripheral devices 125. In addition, the computer system 100 may function without some of the above described components. Although FIG. 4 shows some of the basic components of the computer system 100, it is neither meant to be limiting nor to exclude other components or combinations of components in the system 100.

Figure 5:
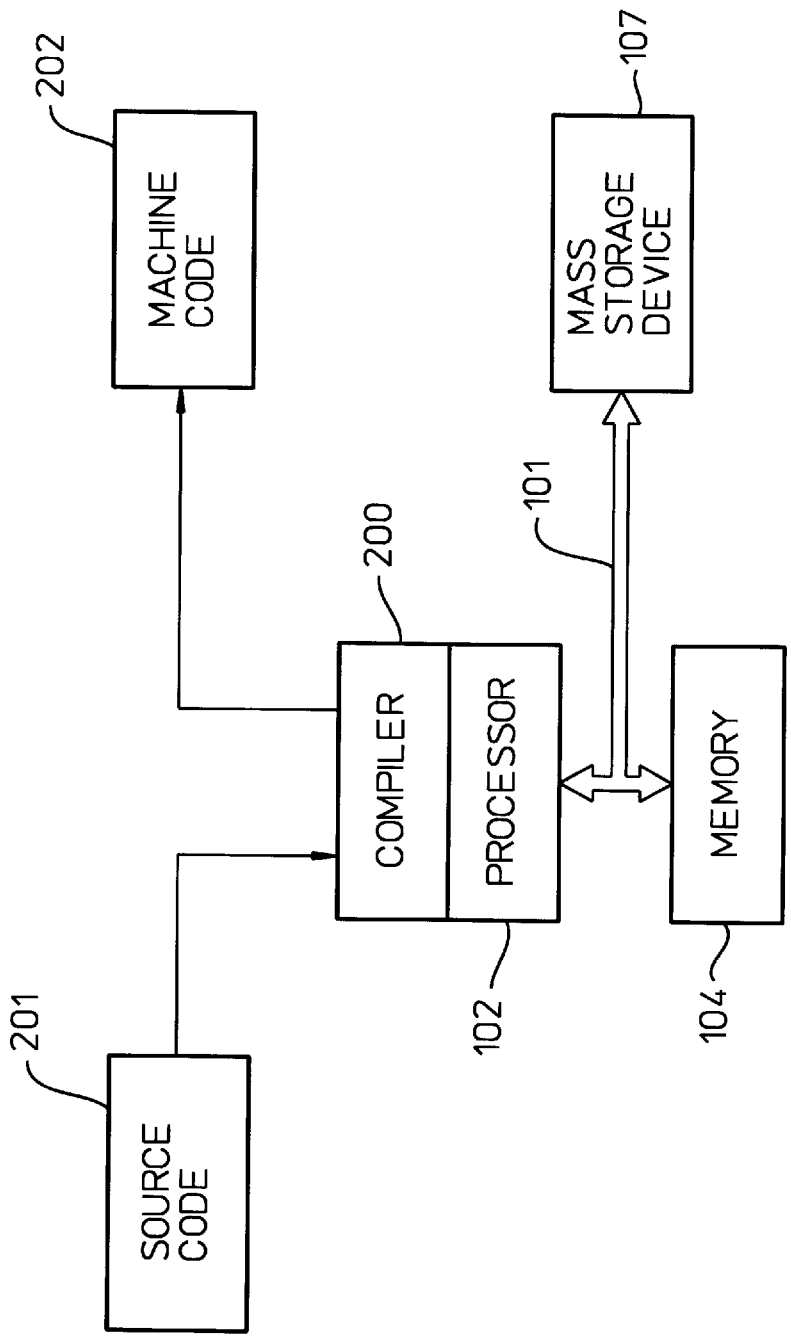
FIG. 5 shows a compiler program for the computer system of FIG. 4 that includes a compiler synthesized dynamic branch prediction function in accordance with one embodiment of the present invention.

As can be seen from FIG. 5, the compiler 200 is run on the processor 102 to compile a source code 201 into a machine code 202. The source code 201 contains a set of instructions, including branch instructions. The machine code 202 is stored in the mass storage device 107. When the machine code 202 is to be executed by the processor 102, the machine code 202 is brought into the memory 104.

As described above, the compiler 200 includes a compiler synthesized dynamic branch prediction function for providing branch prediction to the branch instructions contained in the source code 201. The compiler synthesized dynamic branch prediction function of the compiler 200 implements one embodiment of the present invention. In accordance with one embodiment of the present invention, the compiler synthesized dynamic branch prediction function of the compiler 200 increases the accuracy of the branch prediction by customizing a prediction function for a specific branch prediction. This is achieved by identifying other correlations of the program other than the branch profile information to increase the accuracy.

The compiler synthesized dynamic branch prediction function of the compiler 200 is not hardware based. Rather, the compiler 200 is completely responsible for defining and realizing a prediction function for each branch. Because the contents of the registers in the processor 102 (not shown in FIG. 4) offer complete information on the outcome of a branch when the branch is executed, the compiler synthesized dynamic branch prediction function of the compiler 200 realizes the prediction function using the register contents of the processor 102. In particular, evaluating the branch comparison on the source register values would perfectly predict the branch.

Although the contents of the registers of the processor 102 offer a path to predicting the branch, the prediction may not be perfect eight or sixteen cycles in advance of the branch. As we go back in time from the branch, this information becomes gradually less complete.

In accordance with one embodiment of the present invention, when the compiler 200 compiles the source code 201, the compiler synthesized dynamic branch prediction function of the compiler 200 uses branch profile information and register dump information to define a branch predictor function for each branch and then inserts into the code one or more explicit prediction instructions per branch, ahead of the respective branch instruction to compute the predictor function. A predictor function for a branch defines a condition under which the corresponding branch is to be taken or not taken. The predictor function can then be computed by the inserted instructions to obtain the prediction value of the branch. For example, if it is determined that a branch b is always taken when the value of a register (e.g., register $r_{26}$) of the processor 102 is greater than the value of 10, then the predictor function for that branch is $r_{26}>10$=taken.

In one embodiment, the instructions that compute the predictor functions are inserted into the code after the code has been compiled. In other embodiments, the instructions are inserted into the code before or during the compilation of the code.

The role of these prediction instructions is to compute and predict the branch dynamically. The first major advantage of the compiler synthesized dynamic branch prediction is the flexibility of selecting the predictor function. The compiler 200 is free to realize almost any function including standard hardware prediction functions (such as a 2-bit counter) as well as new functions involving the processor register values. These new predictor functions offer the potential to substantially increase the prediction accuracy where branch history is not effective. Furthermore, a specific predictor function can be tailored for each branch which minimizes cost and maximizes performance. The second advantage is the reduced hardware overhead. Branch prediction state information is no longer maintained and manipulated by a specialized hardware structure. Rather, the compiler 200 uses architecturally visible registers and explicit instructions to compute the branch prediction values. FIGS. 6 through 13 illustrate the compiler synthesized dynamic branch prediction scheme in accordance with one embodiment of the present invention in more detail, which will be described below.

Figure 6:
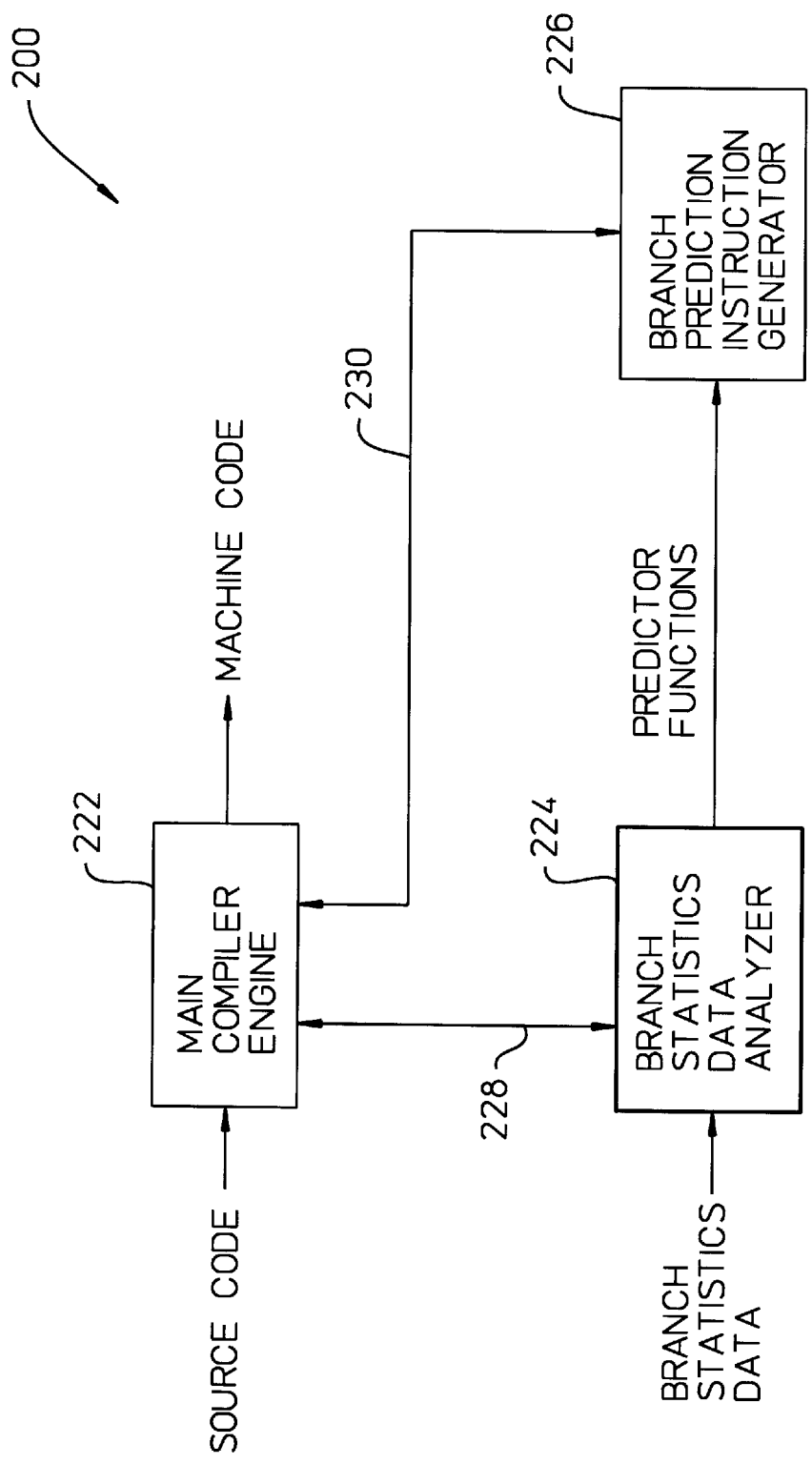
FIG. 6 shows the structure of the compiler of FIG. 5 that includes a branch statistics data analyzer and a branch prediction instruction generator.

FIG. 6 shows the compiler synthesized dynamic branch prediction function of the compiler 200. As can be seen from FIG. 6, the compiler 200 includes a main compiler engine 222, a branch statistics data analyzer 224, and a branch prediction instruction generator 226. The main compiler engine 222 compiles the source code applied into the machine code. The compiling function of the main compiler engine 222 can be realized by any known compiling technology. In addition, the main compiling engine 222 can also add instructions into the compiled code. This can also be done by known compiling technology.

The main compiling engine 222 is connected to the branch statistics data analyzer 224 and the branch prediction instruction generator 226. The branch statistics data analyzer 224 is also connected to the branch prediction instruction generator 226. The branch statistics data analyzer 224 receives the branch statistics data and then analyzes the data to construct a branch predictor function for a branch.

The branch prediction instruction generator 226 receives branch predictor functions from the branch statistics data analyzer 224. The branch prediction instruction generator 226 then generates prediction instructions for each predictor function. The prediction instructions compute the predictor function to obtain the prediction value. The prediction instructions then communicate the prediction value to the processor 102.

For example, the branch prediction instruction generator 226 generates a first prediction instruction to compute the predictor function to obtain the prediction value of the branch and a second prediction instruction to communicate the prediction value to the processor 102. The first instruction can be the compare-to-predicate instruction and the second instruction can be the prepare-to-branch instruction. Alternatively, the branch prediction instruction generator 226 only needs to generate one instruction to both calculate the predictor function and communicate the prediction value to the processor 102.

Once the branch prediction instruction generator 226 generates the prediction instruction or instructions, the main compiling engine 222 can then insert these instructions into the compiled code. In one embodiment, the prediction instructions for a branch are placed approximately sixteen cycles ahead of the branch. In another embodiment, the prediction instructions for a branch are placed approximately thirty two cycles ahead of the branch. Alternatively, the instructions can be placed between one and sixty four cycles ahead of the branch.

In one embodiment, the compiler synthesized dynamic branch prediction of the compiler 200 is used to process every branch instruction in a program. In another embodiment, the compiler synthesized dynamic branch prediction function of the compiler 200 is only used to selectively process some of the branch instructions of the program. This reduces the length of the program, thus causing the program to require less memory to store the program.

The operation of the compiler 200 with respect to the compiler synthesized dynamic branch prediction is described in more detail below. During operation, the source code is first applied to the main compiler engine 222 of the compiler 200. At this time, because no branch statistics data is available, the main compiler engine 222 sets its branch prediction function to default state and only compiles the source code into the machine code. This is referred to as pre-compilation. During pre-compilation, the main compiler engine 222 inserts instrumentation code into the compiled code (i.e., the machine code) to collect the branch statistics data when the machine code is run with the sample input data. This is done using known compiler means.

As described above, the branch statistics data of a branch includes the branch direction information (i.e., the branch profile information) and the register contents of the processor 102 a specific number of machine cycles prior to the execution of the branch. For each branch, the branch profile information is a record of the direction taken for each execution. The register dump information is a dump of the contents of the register file some predetermined distance before the branch. Those register values are those that are available at run-time to compute a prediction.

After the pre-compilation, the machine code is then run by the processor 102 of FIG. 4 for several times with the sample input data to collect the branch statistics data for each branch. This produces the branch profile information and the register dump information (i.e., the branch statistics data) for each branch. FIG. 13 shows an example of the register dump information. FIG. 13 only shows the register dump of a 2-register processor for the purpose of illustration.

The branch statistics data is then applied to the analyzer 224 to be analyzed to identify the correlations between branch directions and the register contents of the processor 102. Based on the analysis, the analyzer 224 constructs the predictor function for each branch. The predictor functions for all branches are then applied to the branch prediction instruction generator 226 which generates prediction instructions to compute the predictor functions. The instructions can then be applied to the main compiler engine 222 upon request from the main compiler engine 222.

Then, the source code is again applied to the main compiler engine 222 for compilation. At this time, because the branch statistics data is available to the analyzer 224, the main compiler engine 222 queries the branch prediction instruction generator 226 via line 230 for the prediction instructions of the branches. Then the main compiler engine 222 inserts the prediction instructions for the predictor functions into the intermediate code of the source code. The engine 222 then reschedules the intermediate code to generate the final machine code.

In one embodiment, the branch statistics data is applied to the branch statistics data analyzer 224 before the source code is again applied to the main compiler engine 222 for compilation. In another embodiment, the branch statistics data is applied to the branch statistics data analyzer 224 at about the same time when the source code is again applied to the main compiler engine 222 for compilation.

FIG. 7 shows one basic routine run by the branch statistics data analyzer 224 for analyzing the register contents to construct the branch predictor function for a single branch in accordance with one embodiment of the present invention. As described above, the predictor function for a branch is synthesized which correlates the values contained in architecture registers of the processor 102 with the direction of the branch. The basic routine is in the context of infinite resources, assuming that the predictor function can be arbitrarily complex. FIG. 8 shows the practical routine run by the branch statistics data analyzer 224 for analyzing the register contents to construct the branch predictor functions for a single branch. The practical routine is the simplified and practical version of the basic routine that takes into account the fact that any real predictor will be restricted to consist of a few instructions. Otherwise, the cost of evaluating the predictor function will outweigh the gains from the increased prediction accuracy.

As can be seen from FIG. 7, the basic routine limits itself to constructing predictor functions that are based on at most two registers in that the predictor function will predict the branch predicate using the value of some two registers, at a predetermined number of cycles prior to the branch. This restriction on the number of registers is not inherent to the routine, and is only in the interest of pragmatics. Apart from this restriction, the basic routine shown in FIG. 7 pays no attention to resource constraints (i.e., there are n registers $r_1$, $r_2$, ..., $r_n$ in the processor). Assume the routine is handling a branch b and the branch predicate value resides in a branch register $r_b$. At any particular execution of the branch, let $v_1$, $v_2$, ..., $v_n$ denote the values of the registers of the processor 102 at a fixed number of cycles prior to the branch b, and let $v_b$ denote the value of the branch predicate after it is evaluated during that run. In other words, $v_1, v_2, \ldots, v_n$ and $v_b$ constitute the entries in the register dump, for a particular pass through the branch, with the values $v_1$–$v_n$ for the registers $r_1$–$r_n$ being a fixed number of cycles prior to the branch, and the value $v_b$ of the branch predicate register $r_b$ just after the branch.

The routine maintains integer value arrays, $C_i$ for each register $r_i$ and $C_{i,j}$ for each pair of registers $r_i$ and $r_j$. There is one entry in $C_i$ for each of the values $r_i$ could take, and one entry in $C_{i,j}$ for each possible pair of values for $r_i$ and $r_j$. This is an impracticable demand and is solely in the interest of expository clarity. FIG. 8 shows the practical routine which is modified from the basic routine of FIG. 7 to respect practical resource constraints.

All the entries in the arrays are initialized to zero. For each pass through the branch b, if the branch predicate evaluated to true ($v_b$ has the value 1), the arrays entries are incremented. In particular, if register $r_i$ has value $v_i$, then entry $C_i[v_i]$ is incremented. Similarly, $C_{i,j}[v_i][v_j]$ is incremented for the pair of registers i and j. If the branch predicate evaluated to false ($v_b$ has the value 0), the corresponding array entries are decremented. In essence, the entries in the array estimate the usefulness of knowing the values of the registers towards predicting the branch. If for a given value v of register $r_i$, the branch predicate evaluates to true much of the time, the array entry $C_i[v]$ will be strongly positive. Conversely, if the branch predicate evaluates to false much of the time, the array entry $C_i[v]$ will be strongly negative. If the branch predicate is evenly distributed between true and false, $C_i[v]$ will be close to zero.

After all the passes through the branch have been processed, the absolute values of the array entries are summed up to assign scores $S_i$ to each register $r_i$ and $S_{i,j}$ to each register pair $r_i$ and $r_j$. The register or register pair with the highest score is the best predictor for the branch.

Once the register or register pair with the highest score has been selected, constructing a predictor function is straightforward. Suppose a single register $r_k$ has the highest score. A predictor function involving $r_k$ would take the value $v_k$ of $r_k$, and check to see whether the array entry $C_k[V_k]$ is positive. If so, the branch is predicted to be "1", else not. If a pair of registers $r_l$ and $r_m$ have the highest score, the predictor function would be similar. If $C_{l,m}[v_l][v_m]$ is positive, the branch predicate would be predicted to be "1", else "0".

To illustrate the working of the basic routine of FIG. 7, we consider that the processor 102 has two registers $r_1$ and $r_2$, and one branch register $r_b$. Suppose for a sample execution in a certain program, a particular branch was executed seven times. The register dump for these seven passes is shown in FIG. 13, where the values of $r_1$ and $r_2$ at 16 cycles prior to the value of $r_b$.

Applying the basic routine, one can get the following values for the array entries.

$C_1[17]=3$; $C_1[19]32 -2$; $C_1[13]=1$; $C_1[14]=-1$;
$C_2[15]=0$; $C_2[12]=2$; $C_2[0]=-1$; $C_2[8]=0$;
$C_{1,2}[17][15]=1$; $C_{1,2}[17][12]=1$;
$C_{1,2}[19][15]=-1$;
$C_{1,2}[13][12]=1$; $C_{1,2}[14][0]=-1$;
$C_{1,2}[19][8]=-1$; $C_{1,2}[17][8]=1$;

From the above array values, $S_1 32\ 7$, $S_2=3$, and $S_{1,2}=7$. Taking $S_1$ to be the maximum of $S_1$, $S_2$, and $S_{1,2}$, the routine of FIG. 7 causes the analyzer 224 of FIG. 6 to output the one-register predictor function based on $r_1$. The predictor function is shown below in simplified form.

if $v_1=17$ or $v_1=13$ then predict 1 else predict 0.

FIG. 8 shows the practical routine of the basic routine of FIG. 7 which reduces the range of the register values. The practical routine of FIG. 8 works in much the same way as the basic routine of FIG. 7 with two exceptions. First, the arrays $C_i$ and $C_{i,j}$ are constructed using quantized register values. Secondly, the score values $S_i$ and $S_{i,j}$ are computed in the context of the one-compare predictor. Specifically, for each array $C_i$, the practical routine of FIG. 8 finds the best cut-point v* that optimally partitions the values of $r_i$, in the sense that predicting the branch predicate to be true (false) for all values that lie below v* and to be false (true) for all other values is optimal over all cut-points. Similarly, for each array $C_{i,j}$, the routine finds the best cut-point (u*, v*) yielding the optimal rectilinear partition of the values of registers $r_i$ and $r_j$.

Applying the practical routine of FIG. 8 to the example of FIG. 13, the same $C_1$, $C_2$, and $C_{1,2}$ can be obtained. The scores $S_1$, $S_2$, and $S_{1,2}$ can now be computed. For $r_1$, v*=18 is the best cut-point, yielding a score $S_1$=5. For $r_2$, v*=1 is the best cut-point, yielding a score $S_2$=3. For the register pair $r_1$, $r_2$, the best cut-point is u*=18 and v*=1 with a score $S_{1,2}$=7. Since $S_{1,2}$ is the maximum among these scores, the routine of FIG. 8 causes the analyzer 224 to output the two-register/two-compare predictor function based on register $r_1$ and $r_2$. The predictor function is shown below in simplified form.

Two-register/Two-compare predictor based on $r_1$, $r_2$
if $v_1<18$, $v_2 \geq 1$ then predict "1" else predict "0".

Figure 9:
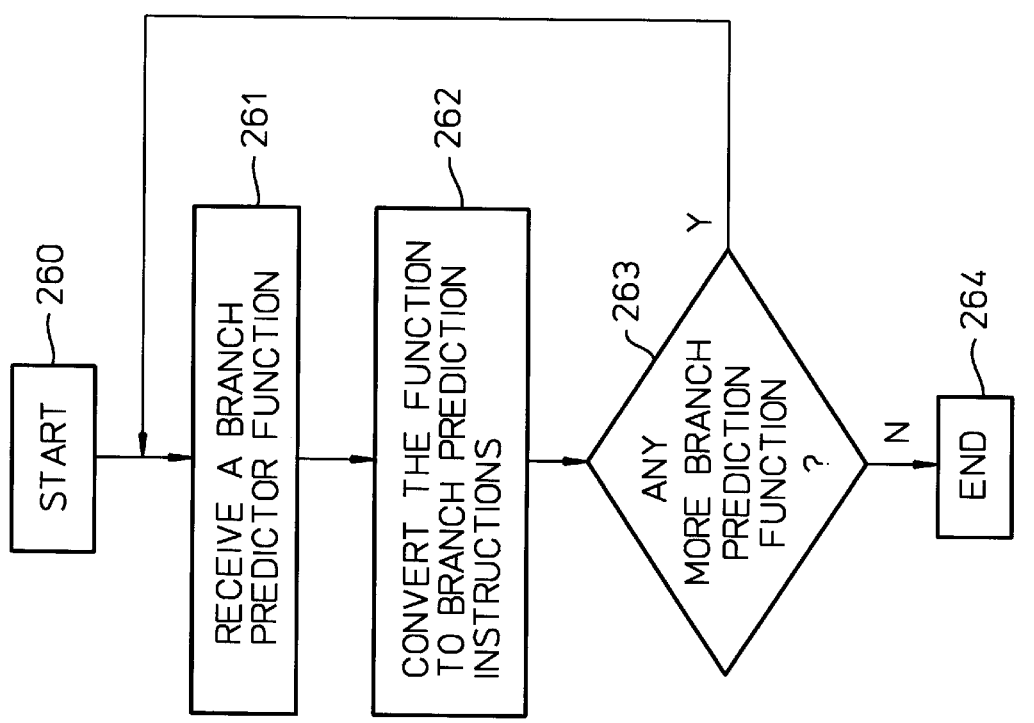
FIG. 9 is a flow chart diagram showing the process of the branch prediction instruction generator.

FIG. 9 is the flow chart diagram of the process of the branch prediction instruction generator 226 of FIG. 6. As can be seen from FIG. 9, the process starts at step 260. At step 261, the generator 226 receives a branch predictor function for a branch. At step 262, the predictor function is represented by one or more prediction instructions. These instructions are used to compute the predictor function.

Step 263 is a judgement step at which it is determined if more predictor functions need to be processed. If the answer is yes, then step 261 is repeated. If the answer is no, then the process ends at step 264.

Figure 10:
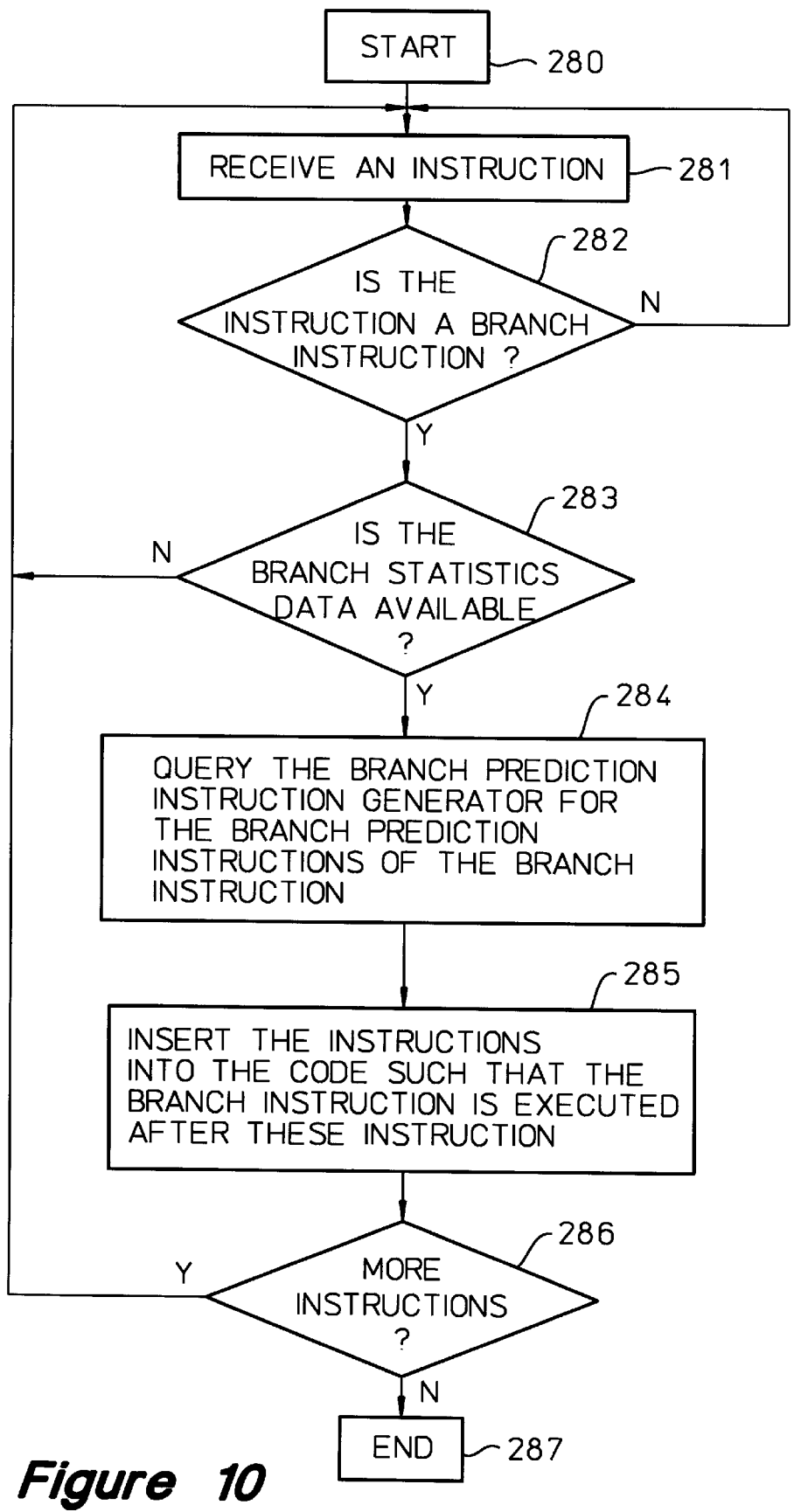
FIG. 10 is a flow chart diagram showing the process of the main compiler engine of the compiler of FIG. 6.

FIG. 10 shows the flow chart of the main compiler engine 222 of FIG. 6 in handling a branch instruction. As can be seen from FIG. 10, step 283 determines if the received instruction is a branch instruction. The process loops back to step 281 if the instruction is not a branch instruction. At step 284, the main compiler engine 222 queries the branch prediction instruction generator 226 for the prediction instructions to be inserted before the branch instruction. At step 285, the engine 222 insert those instructions into the program to compute the predictor function of the branch. At step 286, the engine 222 determines if more instructions need to be processed. If so, the process loops back to the step 282. If not, the process ends at step 286.

The effectiveness of the compiler synthesized dynamic branch prediction scheme in accordance with one embodiment of the present invention is illustrated in FIGS. 11 and 12. In FIGS. 11–12, the misprediction rates of various benchmark codes using the compiler synthesized dynamic branch prediction scheme are compared with that of the same codes using the prior art static and dynamic branch prediction schemes. The overall performance of the compiler synthesized dynamic branch prediction scheme in comparison with other common branch prediction schemes is shown in FIG. 11. It is to be noted that the compiler synthesized dynamic branch prediction scheme is only applied to a select subset of the branches with the remaining branches being treated with the conventional static predictor. FIG. 12 is similar to FIG. 11, but compares the performance of the various predictors only over the branches that were treated by the compiler synthesized branch prediction scheme.

As can be seen from FIGS. 11–12, the misprediction rate for all of the listed codes using the compiler synthesized dynamic branch prediction is lower than that using either prior art scheme.

Figure 14:
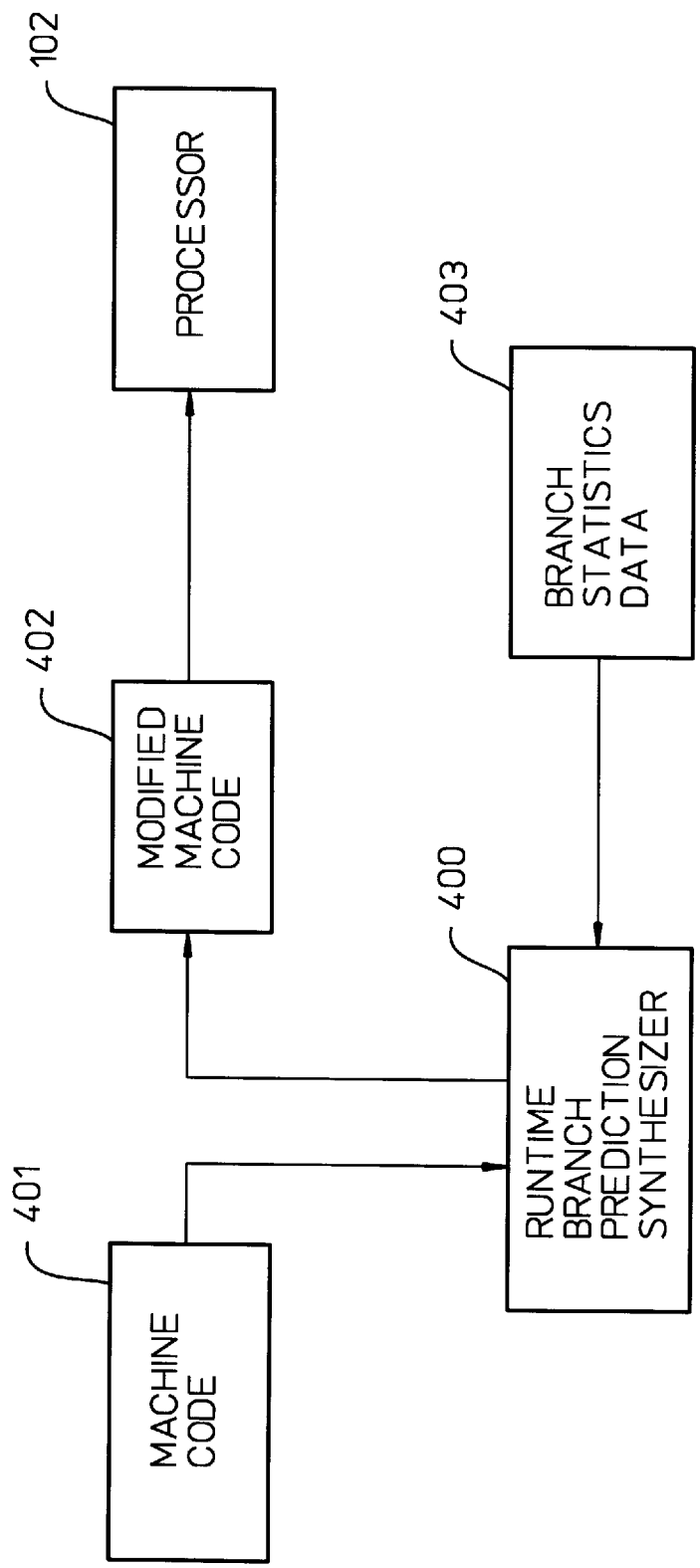
FIG. 14 shows a runtime branch prediction synthesizer for the computer system of FIG. 4 in accordance with another embodiment of the present invention.
Figure 15:
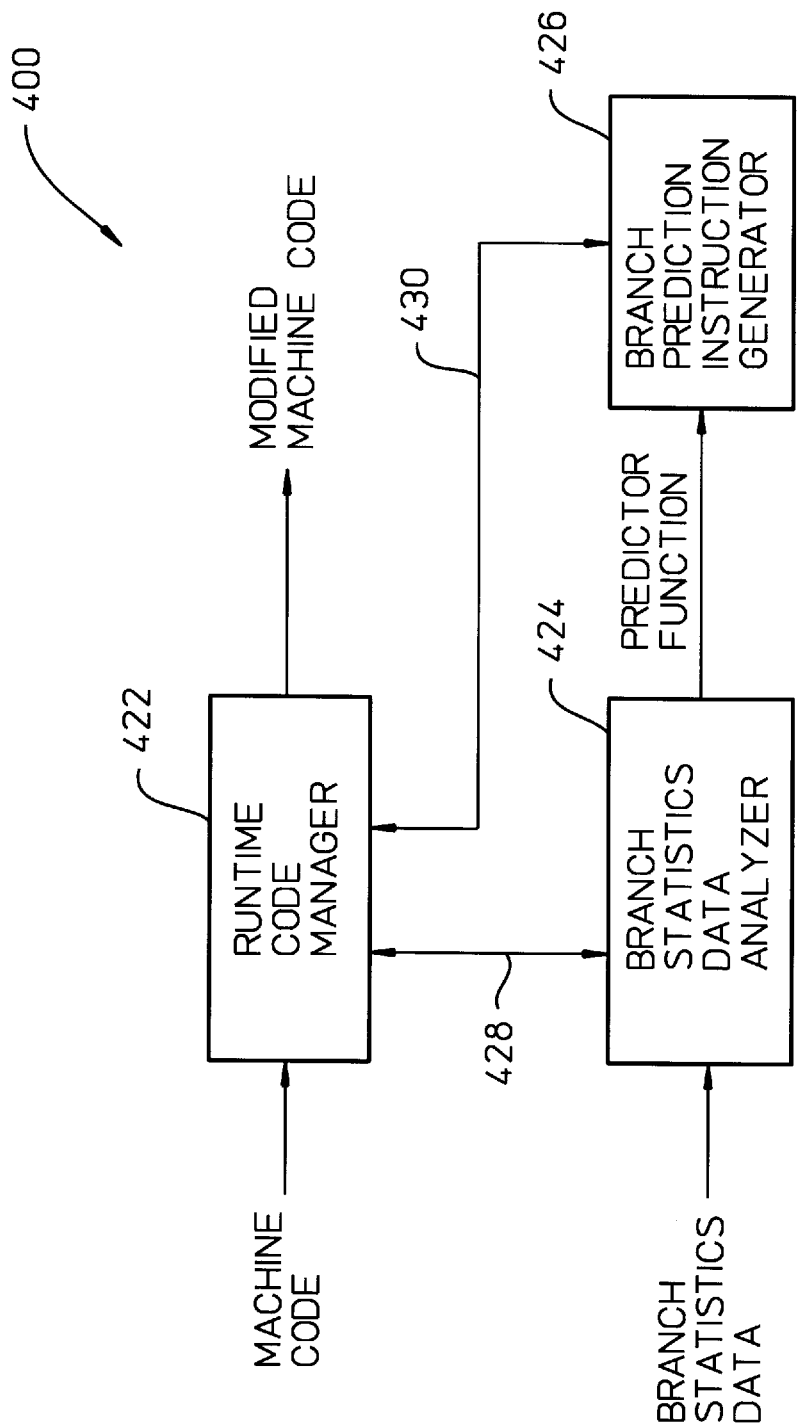
FIG. 15 shows the structure of the runtime branch prediction synthesizer of FIG. 5.

Alternatively, the compiler synthesized dynamic branch prediction function described above can also be implemented by other means. For example, synthesized dynamic branch prediction function can be implement by hardware and/or microcode. For example, FIGS. 14 and 15 show one such implementation. As can be seen from FIG. 14, the machine code 401 and the branch statistics data 403 are fed to a runtime branch prediction synthesizer 400 to generate the modified machine code 402 which is then run by the processor 102. The synthesizer 400 is implemented by hardware. FIG. 15 shows the structure of the synthesizer 400 which includes a runtime code manager 422 in addition to the branch statistics data analyzer 424 and the branch prediction instruction generator 426. The functions of the analyzer 424 and generator 426 are identical to that of the analyzer 224 and generator 226 of FIG. 6. The runtime code manager 422 inserts the generated prediction instructions from the generator 426.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A compiler, comprising:
    (A) a branch statistics data analyzer that analyzes branch statistics data of a branch instruction to construct a branch predictor function for the branch instruction, wherein the branch statistics data includes branch profile information and register dump information;
    (B) a branch prediction instruction generator coupled to the branch statistics data analyzer to generate at least one prediction instruction to implement the branch predictor function;
    (C) a main compiling engine coupled to the branch prediction instruction generator to insert the prediction instruction before the branch instruction.

2. The compiler of claim 1, wherein the branch statistics data analyzer constructs the branch predictor function by analyzing the branch profile information and the register dump information to identify correlations between branch directions and register contents.

3. The compiler of claim 2, wherein the branch predictor function correlates at least one register content with the branch direction of the branch instruction.

4. The compiler of claim 3, wherein the branch prediction instruction generator generates a prepare-to-branch instruction that specifies the branch target address of the branch instruction and a compare instruction that compares the register content with a threshold value specified by the branch predictor function.

5. The compiler of claim 1, wherein the main compiling engine is also coupled to the branch statistics data analyzer to determine if the branch statistics data is available in the branch statistics data analyzer before compiling the branch instruction, wherein when the main compiling engine determines that the branch statistics data is not available to the branch statistics data analyzer, the main compiler engine does not insert any instruction when compiling the source code that contains the branch instruction.

6. The compiler of claim 1, wherein the prediction instruction, when inserted, is one to sixty-four cycles prior to the branch instruction.

7. A method of dynamically predicting a branch instruction of a program, comprising the steps of:
    analyzing branch statistics data of the branch instruction to construct a branch predictor function for the branch instruction, wherein the branch statistics data includes branch profile information and register dump information;

(B) generating at least one prediction instruction to implement the branch predictor function;

(C) a inserting the prediction instruction before the branch instruction.

8. The method of claim 7, wherein the step of analyzing further comprises the steps of:

(i) analyzing the branch profile information and the register dump information of the branch instruction to identify correlations between branch directions and register contents;

(ii) generating the branch predictor function based on the correlations between branch directions and register contents.

9. The method of claim 8, wherein the step (i) further comprises the steps of:

(a) determining the content of each register some time prior to each execution of the branch instruction;

(b) determining the branch direction for each execution of the branch instruction;

(c) establishing the correlations between the branch directions and the register contents by determining at what content value of which register, the branch instruction branches.

10. The method of claim 7, wherein the step of generating generates a compare instruction that implements the branch predictor function and a prepare-to-branch instruction that specifies the branch target address of the branch instruction upon receiving the branch predictor function.

11. The method of claim 7, further comprising the steps of:

(D) determining if the branch statistics data is available in the branch statistics data analyzer prior to the step (C);

(E) if the branch statistics data is not available to the branch statistics data analyzer, then not performing the step (C) when compiling the source code that contains the branch instruction.

12. An apparatus, comprising:

(A) a storage medium;

(B) a computer executable compiler program stored in the storage medium that dynamically predicts a branch instruction of a program, the computer executable compiler program further comprising (a) a first set of instructions that analyze branch statistics data of the branch instruction to obtain a branch predictor function for the branch instruction, wherein the branch statistics data includes branch profile information and register dump information;

(b) a second set of instructions that generate at least one prediction instruction to implement the branch predictor function;

(c) a third set of instructions that insert the prediction instruction before the branch instruction when compiling a source code containing the branch instruction into a machine code.

13. The apparatus of claim 12, wherein the first set of instructions further comprises:

(i) a first subset of instructions that analyze the branch profile information and the register dump information of the branch instruction to identify correlations between branch directions and register contents;

(ii) a second subset of instructions that generate the branch predictor function based on the correlations between branch directions and register contents.

14. The apparatus of claim 13, wherein the first subset of instructions analyzes the branch profile information and the register dump information of the branch instruction by (a) determining the content of each register some time prior to each execution of the branch instruction;

(b) determining the branch direction for each execution of the branch instruction;

(c) establishing the correlations between the branch directions and the register contents by determining at what content value of which register, the branch instruction branches.

15. The apparatus of claim 12, further comprising:

(D) a fourth set of instructions that determine if the branch statistics data is available in the branch statistics data analyzer prior to compilation of the source code that contains the branch instruction;

(E) a fifth set of instructions that cause the third set of instructions not to insert the prediction instruction if the branch statistics data is not available.

16. The apparatus of claim 12, wherein the second set of instructions generates a compare instruction that implements the branch predictor function and a prepare-to-branch instruction that specifies the branch target address of the branch instruction upon receiving the branch predictor function.

17. The apparatus of claim 12, wherein the prediction instruction, when inserted, is one to sixty-four cycles prior to the branch instruction.

18. A runtime branch prediction synthesizer, comprising:

(A) a branch statistics data analyzer that analyzes branch statistics data of a branch instruction to construct a branch predictor function for the branch instruction, wherein the branch statistics data includes branch profile information and register dump information, wherein the branch statistics data analyzer constructs the branch predictor function by analyzing the branch profile information and the register dump information to identify correlations between branch directions and register contents;

(B) a branch prediction instruction generator coupled to the branch statistics data analyzer to generate at least one prediction instruction to implement the branch predictor function;

(C) a runtime code manager coupled to the branch prediction instruction generator to insert the prediction instruction before the branch instruction.

19. The runtime branch prediction synthesizer of claim 18, wherein the branch predictor function correlates at least one register content with the branch direction of the branch instruction, wherein the branch prediction instruction generator generates a prepare-to-branch instruction that specifies the branch target address of the branch instruction and a compare instruction that compares the register content with a threshold value specified by the branch predictor function.

* * * * *